S. C. RAND.
TIRE CASING.
APPLICATION FILED NOV. 2, 1916.
1,316,594. Patented Sept. 23, 1919.
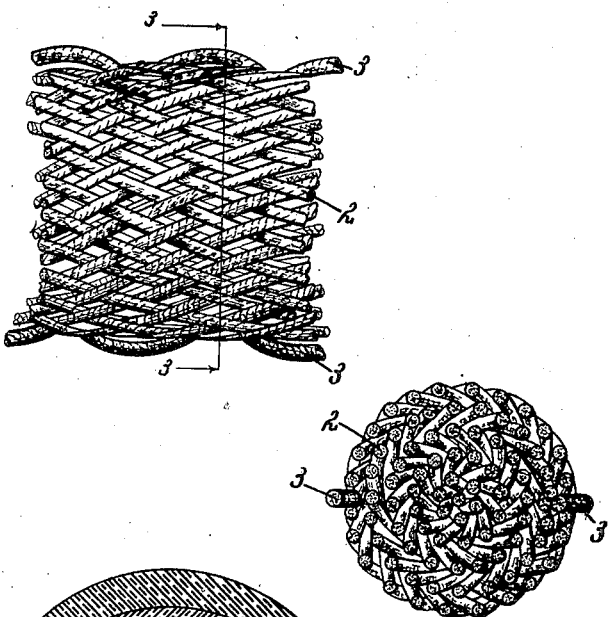
Fig. II.
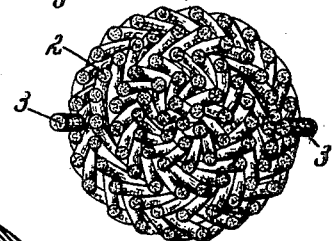
Fig. III.
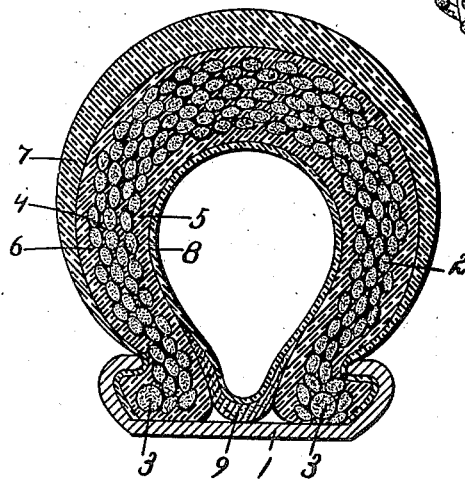
Fig. I
WITNESSES:
Lenn Gilman
Luther Blake
INVENTOR.
SILAS C. RAND
BY Chappell & Earl
ATTORNEYS.

UNITED STATES PATENT OFFICE.

SILAS C. RAND, OF CHICAGO, ILLINOIS.

TIRE-CASING.

1,316,594.　　　　　Specification of Letters Patent.　　Patented Sept. 23, 1919.

Application filed November 2, 1916. Serial No. 129,147.

*To all whom it may concern:*

Be it known that I, SILAS C. RAND, a citizen of Great Britain, residing at Chicago, county of Cook, State of Illinois, have invented certain new and useful Improvements in Tire-Casings, of which the following is a specification.

This invention relates to improvements in tire casings.

The main objects of my invention are:

First, to provide an improved tire casing in which the tire is supported by a fabric well adapted to sustain the various stresses to which it is subjected in use.

Second, to provide an improved tire casing which is very durable and at the same time is comparatively inexpensive.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a cross section of a tire embodying the features of my invention, the same being shown upon a rim, the rim being shown conventionally.

Fig. II is a detail plan view of a section of rope from which I form the fabric of my improved tire.

Fig. III is a cross section on a line corresponding to line 3—3 of Fig. II.

In the drawing, similar reference characters refer to similar parts throughout the several views.

Referring to the drawing, the rim 1 is shown conventionally and is illustrated merely to show an application of my improvements.

The fabric or casing body 2 of my improved tire casing is formed of strands loosely braided into a rope as illustrated in Figs. II and III, preferably as an endless or annular part and then compressed or conformed into a U cross section or into a cross section corresponding to that of the casing.

The strands are braided quite loosely so that the rope may be compressed and conformed into U shape, and when so compressed and shaped the fabric is formed of strands interbraided and interlocking in every direction and extending longitudinally and transversely across the tire.

I preferably interweave bead strands 3 with the edge strands of the fabric.

The conformed braided strands are embedded in rubber 4 so that the spaces or interstices between the strands are filled with the rubber and the inner and outer faces 5 and 6 respectively are provided for the fabric. The inner and outer facings are interlocked with each other throughout the casing by the portions between the strands. The strands are so interbraided and interlocked that while they support the strains and stresses in every direction they permit great freedom of movement.

The tire is very resilient and may be subjected to a great deal of flexing movement without serious injury to the fabric.

I preferably provide an outer tread or wear portion 7 of different composition from that embedding and facing the fabric.

I illustrate an inner tube 8 which is disposed within the casing in the usual manner, the inner side of the tube being protected by the strip 9.

My improved tire is, as stated, economical to produce and at the same time has great strength and durability and may be used under less pressure than tires as commonly constructed without serious injury thereto.

Having thus described my invention, what I claim as new and desire to secure by Letters Patent, is:

1. A tire casing consisting of a single annular fabric, the strands of which are braided as in a rope, a resilient compound filling between and embedding the strands and forming an inner and outer casing for the fabric, and a resilient tread portion secured to the outer casing portion of such embedding compound.

2. A tire casing consisting of a single annular fabric, the strands of which are braided as in a rope, and a resilient compound filling between and embedding the strands and forming an inner and outer casing for the fabric.

3. A tire casing including a single annular fabric, the strands of which are braided as in a rope.

In witness whereof, I have hereunto set my hand and seal in the presence of two witnesses.

SILAS C. RAND. [L. S.]

Witnesses:
W. R. MACLEAR,
SIDNEY G. GAGE.